(12) United States Patent
Fukushima (10) Patent No.: US 11,612,923 B2
(45) Date of Patent: Mar. 28, 2023

(54) COLD ROLLING MILL AND COLD ROLLING METHOD

(71) Applicant: JFE Steel Corporation, Tokyo (JP)

(72) Inventor: Tatsuhito Fukushima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 117 days.

(21) Appl. No.: 16/488,339

(22) PCT Filed: Feb. 20, 2018

(86) PCT No.: PCT/JP2018/005853
§ 371 (c)(1),
(2) Date: Aug. 23, 2019

(87) PCT Pub. No.: WO2018/159370
PCT Pub. Date: Sep. 7, 2018

(65) Prior Publication Data
US 2020/0230673 A1  Jul. 23, 2020

(30) Foreign Application Priority Data
Feb. 28, 2017 (JP) .............................. JP2017-035641

(51) Int. Cl.
*B21B 45/02* (2006.01)
*B21B 1/22* (2006.01)

(52) U.S. Cl.
CPC ............ *B21B 45/0248* (2013.01); *B21B 1/22* (2013.01); *B21B 45/0251* (2013.01)

(58) Field of Classification Search
CPC ....... B21B 37/44; B21B 37/74; B21B 45/004; B21B 45/008; B21B 45/02;
(Continued)

(56) References Cited

U.S. PATENT DOCUMENTS

| 2011/0111124 A1* | 5/2011 | Pawelski | ................. | B21B 27/10 |
| | | | | 427/255.25 |
| 2014/0250963 A1* | 9/2014 | Nelson | .................... | B21B 27/10 |
| | | | | 72/12.7 |
| 2016/0339494 A1* | 11/2016 | Sano | ...................... | B21B 45/004 |

FOREIGN PATENT DOCUMENTS

| EP | 2303480 B1 | 6/2013 |
| JP | 5370063 A | 6/1978 |

(Continued)

OTHER PUBLICATIONS

JP 2012055955 Machine Translation, 2012 (Year: 2012).*

(Continued)

*Primary Examiner* — Debra M Sullivan
*Assistant Examiner* — Matthew Stephens
(74) *Attorney, Agent, or Firm* — RatnerPrestia (57) ABSTRACT

In a tandem type cold rolling mill of a circulating oil-feeding system for continuously rolling a steel sheet by feeding a coolant serving as a rolling oil and a cooling water to each stand, an edge heater for heating both edge portions of the steel sheet to not lower than 60° C. as a steel sheet temperature at an entry side of a roll bite is arranged at an upstream side of the first stand in the cold rolling mill and a device for jetting a coolant having a concentration higher than that of the coolant fed to the firsts stand onto surfaces of both edge portions of the steel sheet is arranged between the edge heater and the first stand. The cold rolling mill can be used to roll a hard-to-roll material such as silicon or stainless steel sheet without causing an edge crack or sheet breakage in low-speed rolling.

8 Claims, 3 Drawing Sheets

(58) Field of Classification Search
CPC ............ B21B 45/0203; B21B 45/0206; B21B 45/0209; B21B 45/0215; B21B 45/0218; B21B 45/0233; B21B 45/0239; B21B 45/0242; B21B 45/0248; B21B 45/0251; B21B 37/22; B21B 13/06; B21B 1/224
See application file for complete search history.

(56) References Cited

FOREIGN PATENT DOCUMENTS

| JP | 6115919 A | | 1/1986 | |
|----|-----------|---|--------|---|
| JP | 11172325 A | | 6/1999 | |
| JP | 11290931 A | | 10/1999 | |
| JP | 2005193242 A | | 7/2005 | |
| JP | 2007144514 A | * | 6/2007 | |
| JP | 2011051001 A | | 3/2011 | |
| JP | 2011224594 A | * | 11/2011 | ............ B21B 1/26 |
| JP | 2011224594 A | | 11/2011 | |
| JP | 2011240397 A | * | 12/2011 | |
| JP | 2012055955 A | * | 3/2012 | |
| JP | 2012055955 A | | 3/2012 | |
| JP | 2012148310 A | | 8/2012 | |

OTHER PUBLICATIONS

JP 2011224594 Machine Translation, 2011 (Year: 2011).*
JP-2011240397 Machine Translation, 2011 (Year: 2011).*
JP-2007144514-A Machine Translation, 2011 (Year: 2007).*
Kimura, Yukio et al. "High-Speed Rolling by Hybrid-Lubrication System in Tandem Cold Rolling Mills." Oct. 12, 2014; Journal of Materials Processing Technology, vol. 216; pp. 357-368 (Year: 2014).*
International Search Report and Written Opinion for International Application No. PCT/JP2018/005853, dated May 15, 2018—4 pages.
Japanese Concise Statement of Relevance of Office Action for Japanese Application No. 2018-526952, dated Jul. 11, 2018—5 pages.
Chinese Office Action with Search Report for Chinese Application No. 201880012150.0, dated Apr. 1, 2020, 9 pages.
Korean Office Action for Korean Application No. 2019-7023771, dated Sep. 17, 2020, with Concise Statement of Relevance of Office Action, 6 pages.
Extended European Search Report for European Application No. 18 761 758.4, dated Jan. 27, 2020, 7 pages.

* cited by examiner

COLD ROLLING MILL AND COLD ROLLING METHOD

CROSS REFERENCE TO RELATED APPLICATIONS

This is the U.S. National Phase application of PCT/JP2018/005853, filed Feb. 20, 2018, which claims priority to Japanese Patent Application No. 2017-035641, filed Feb. 28, 2017, the disclosures of each of these applications being incorporated herein by reference in their entireties for all purpose.

FIELD OF THE INVENTION

This invention relates to a cold rolling mill and a cold rolling method, more particularly to a tandem type cold rolling mill suitable for use in the rolling of hard-to-roll material such as silicon steel sheet, stainless steel sheet and the like and a cold rolling method using such a cold rolling mill.

BACKGROUND OF THE INVENTION

In conventional cold rolling of a steel strip (steel sheet), it is usual to conduct the rolling under a condition that the temperature of a steel sheet material to be rolled is room temperature or about 40° C. at most, irrespective of whether a cold rolling mill to be used is a tandem type in which plural rolling mills are tandemly arranged or a reverse type comprised of a single stand, and also irrespective of a batch type for rolling the steel strip every single coil or a continuous type for welding the steel strip at an entrance side of a rolling mill to continuously conduct rolling. This is due to the known fact that deformation resistance is decreased to improve rolling property as the temperature increases as a nature of the steel sheet, but the increase in energy cost required for increasing the steel sheet temperature becomes large as compared to the above merit and the production process is made complicated due to the increase in the sheet temperature and a problem is caused in the handling.

In the usual cold rolled steel sheet as defined in JIS G3141, an edge crack produced in a widthwise end portion (edge portion) of the steel sheet is small even in the cold rolling conducted at a temperature of room temperature level as described above, so that a big problem such as sheet breakage or the like is not caused in operation. However, a silicon steel sheet (electrical steel sheet) containing not less than 1 mass % Si and a stainless steel sheet containing a great amount of an alloying element such as Cr, Ni or the like are hard and easily embrittled as compared to the common cold rolled steel sheet, so that when the cold rolling is conducted at a room temperature level, a large edge crack is caused in an edge portion of the steel sheet after the rolling, and there is a problem that sheet breakage is caused in the rolling as a worst case.

As a technique for solving this problem, for example, Patent Literature 1 discloses a cold rolling method wherein a silicon steel sheet is fed to a rolling mill after an edge portion of the sheet is heated to a temperature of not lower than 60° C. being a ductile-brittle transition temperature in a Charpy impact test with an induction heating device at an entrance side of the rolling mill in the cold rolling.

Figure 1:
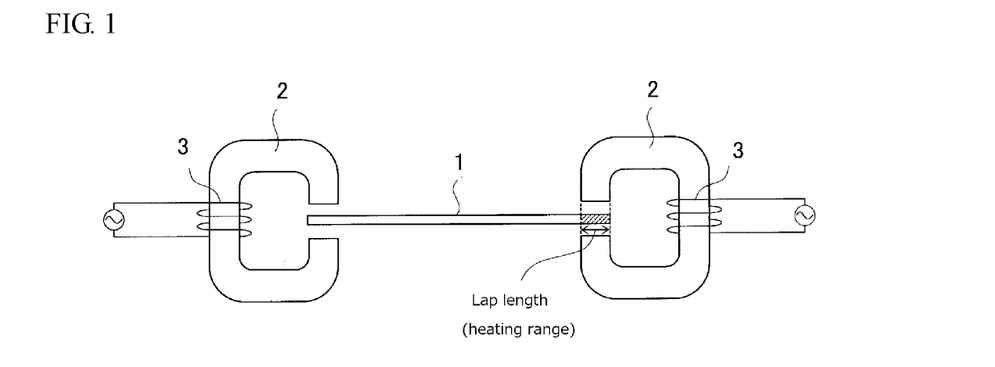
FIG. 1 is a schematic view of an induction heating device using C-type inductors (introducers).

Patent Literature 2 discloses an induction heating device using a pair of C-type inductors (introducers) as shown in FIG. 1 as a means for heating an edge portion of a steel sheet. In the induction heating device, each edge portion of the steel sheet 1 is inserted in a slit portion of the C-type inductor 2 and held from the top and bottom, and a high-frequency current is flowed to an induction heating coil 3 to generate a high-frequency magnetic flux, whereby an induction current is generated in the edge portion of the steel sheet and the edge portion of the steel sheet is heated by Joule heat generated by the induction current.

In order to heat the edge portion of the steel sheet to a given temperature with the above induction heating device, it is necessary that the position of the inductor is adjusted in accordance with the change of the width of the steel sheet so that the an overlapping length (lap length) of the edge portion of the steel sheet and the inductor holding the edge portion from the top and bottom is within a preset range. In an actual operation, however, meandering is caused in the steel sheet due to the poor flatness or the like, and the edge portion of the steel sheet is moved in the widthwise direction of the sheet, so that the lap length in the each edge portion of the steel sheet is changed in addition to the above change of the width. In the edge portion located at a side where the lap length is decreased, for example, the occurrence of eddy current which blocks the flow of the magnetic flux is decreased to lower the power factor and increase the reactive current, so that a given output is not attained even when the coil current is increased, causing poor heating. Contrarily, the lap length increases and abnormal heating is caused in the edge portion located at the opposite side. As a result, edge crack is caused in the edge portion insufficiently heated during the rolling, while edge wave is generated by thermal expansion in the edge portion abnormally heated, and thus it is difficult to conduct stable rolling. Therefore, it is important to control the lap length to an optimum value when the edge portion of the steel sheet is heated to a given temperature by the induction heating. Such an induction heating device for controlling the lap length to the given range is disclosed, for example, in Patent Documents 3 and 4.

A feeding system of a lubricant oil (rolling oil) to the cold rolling mill includes a circulating oil-feeding system and a direct oil-feeding system. The former system is usual for the common cold rolled steel sheet. This system is such that a rolling oil such as soluble oil, mineral oil or the like is emulsified (dispersed) into water to form an emulsion and fed to the steel sheet or work rolls of the rolling mill to conduct rolling and the used emulsion is recovered and cyclically used. In this system, the emulsion acts as not only a rolling lubricant but also a cooling agent. Therefore, the emulsion is also called as a rolling oil or a coolant. In the invention, the emulsion is called as "coolant" hereinafter.

The concentration of the rolling oil contained in the coolant used in the circulating oil-feeding system depends on the type of the rolling oil and is usually about 2-4 mass %, so that primary unit of the rolling oil is excellent, but it may be disadvantageous to the rolling of hard-to-roll material such as hard material, extremely thin material and the like. As a method of further improving the rolling lubricity is proposed a hybrid method wherein a small amount of a high-concentration coolant is directly jetted onto a surface of the steel sheet while using a low-concentration coolant (see, for example, a Non-patent Literature 1). In this method, the high-concentration coolant is used in or after the second stand from a viewpoint of keeping cleanness by decreasing an amount of the cyclically used rolling oil.

PATENT LITERATURE

Patent Literature 1: JP-A-S61-015919
Patent Literature 2: JP-A-H11-290931

Patent Literature 3: JP-A-S53-070063
Patent Literature 4: JP-A-H11-172325

Non-Patent Literature

Non-patent Document 1: "Theory and practice of sheet rolling" published by The Iron and Steel Institute of Japan, p 208-211 (1984)

SUMMARY OF THE INVENTION

In a tandem type cold rolling mill of circulating oil-feeding system, a steel sheet is rolled while jetting a low-concentration coolant acting as a lubricant and a cooling agent from an entry side and an exit side of each stand onto an outer periphery of a work roll and/or between the work roll and a middle roll or a backup roll. Even if an edge portion of the steel sheet is heated to a temperature of not lower than 60° C. by an edge heater at an upstream side of the first stand by applying the method of Patent Document 1 or 2, it is cooled by the low-concentration coolant jetted at the entry side of the first stand or a liquid pool formed in a roll bite, so that the temperature of the steel sheet decreases to not higher than 60° C. at the time of arrival to the roll bite of the first stand. Such a cooling becomes remarkable particularly in a low speed rolling performed when a welded portion between a preceding coil and a succeeding coil are rolled, because the time until the steel sheet arrives at the roll bite becomes longer. Therefore, the heating temperature with the edge heater is necessary to be set to a higher value in view of the cooling by the coolant, and electric energy required for the heating is increased accordingly.

Further, it is necessary that a proper amount of rolling oil is supplied to roll the steel sheet. However, a plate-out amount of the rolling oil contained in the coolant to the steel sheet surface is more decreased as the temperature of the steel sheet becomes higher. As a result, the edge portion of the steel sheet heated with the edge heater is apt to be lacking for lubrication as compared to the widthwise central portion, which is more disadvantageous to edge crack or sheet breakage, so that it is necessary to refill the rolling oil in some way. However, increasing the jetting amount of the low-concentration coolant merely causes an increase in heat loss through the coolant but does not contribute to improvement of the rolling property of the edge portion of the steel sheet.

The invention is made in consideration of the above problems inherent to the prior art, and an object thereof is to provide a cold rolling mill capable of rolling hard-to-roll material such as silicon steel and stainless steel without causing edge crack and breakage of the steel sheet edge even in a low speed rolling, and also a cold rolling method using such a cold rolling mill.

The inventors have made various studies regarding a method for solving the above task, focusing on the hybrid type oil-feeding system disclosed in Non-patent Document 1. As a result, it has been found out that a plate-out amount of the rolling oil can be ensured while suppressing the temperature dropping in the edge portion of the steel sheet due to the coolant by heating both edge portions of the steel sheet at an upstream side of the first stand in the tandem type cold rolling mill by an edge heater and thereafter jetting a high-concentration coolant onto the edge portions of the steel sheet, and consequently the hard-to-roll material can be rolled without causing edge crack or sheet breakage even in the low speed rolling, and the invention has been accomplished.

The invention according to exemplary embodiments is based on the above knowledge and is a cold rolling mill of a tandem type of a circulating oil-feeding system for feeding a coolant serving as a rolling oil and a cooling water to each stand to continuously conduct rolling of a steel sheet, wherein an edge heater for heating both edges of the steel sheet to not lower than 60° C. as a temperature of the steel sheet at an entry side of a roll bite is arranged at an upstream side of a first stand in the cold rolling mill and an equipment for jetting a coolant having a concentration higher than that of the coolant fed to the first stand onto the surfaces of the both edge portions of the steel sheet is arranged between the edge heater and the first stand.

The cold rolling mill according to embodiments of the invention is characterized in that the edge heater is an induction heating device which heats only the edge portions of the steel sheet by inserting each edge portion of the steel sheet into a slit portion of a C-type inductor to hold it from the top and bottom.

The high-concentration coolant in the cold rolling mill according to embodiments of the invention is characterized by containing a rolling oil in a concentration of not less than 10 mass %.

Further, the invention according to exemplary embodiments is a method for cold rolling a steel sheet with a tandem type cold rolling mill of a circulating oil-feeding system for feeding a coolant serving as a rolling oil and a cooling water to each stand, which comprises heating both edge portions of the steel sheet at an upstream side of a first stand of the cold rolling mill with an edge heater so that a steel sheet temperature at an entry side of a roll bite in the first stand is not lower than 60° C., and jetting a coolant having a concentration higher than that of the coolant fed to the first stand onto the surfaces of both edge portions of the steel sheet before the both heated edge portions of the steel sheet arrive at the roll bite of the first stand.

The high-concentration coolant in the cold rolling method according to embodiments of the invention is characterized by containing a rolling oil in a concentration of not less than 10 mass %.

The cold rolling method according to embodiments of the invention is characterized in that the jetting amount of the high-concentration coolant and/or the jetting amount of the low-concentration coolant at the entry side of the first stand are/is adjusted in accordance with the rolling speed.

According to the invention, the edge portion of the steel sheet is heated with the edge heater arranged at the upstream side of the first stand in the tandem type cold rolling mill, and thereafter a small amount of the coolant having a concentration higher than that of the coolant fed to the first stand of the cold rolling mill is jetted onto the surfaces of the both edge portions of the steel sheet between the edge heater and the first stand, whereby heat loss due to the jetting of the high-concentration coolant can be reduced, and the plate-out property of the rolling oil to the steel sheet surface can be improved. According to the invention, therefore, the temperature of the edge portion of the steel sheet can be stably increased to not lower than 60° C. at the entry side of the roll bite without conducting excessive heating with the edge heater, and also the plate-out amount of the rolling oil to the steel sheet surface can be ensured. According to the invention, even when the hard-to-roll material such as silicon steel sheet or stainless steel sheet is subjected to cold rolling at a low speed, rolling troubles such as edge crack at widthwise end portion, sheet breakage and the like can be prevented while suppressing increase in heating power or rise of primary unit of a rolling oil, which largely contributes to improvement of product quality, decrease in production cost and increase in the productivity.

DETAILED DESCRIPTION OF EMBODIMENTS OF THE INVENTION

The invention according to exemplary embodiments will be described in detail below.

Figure 2:
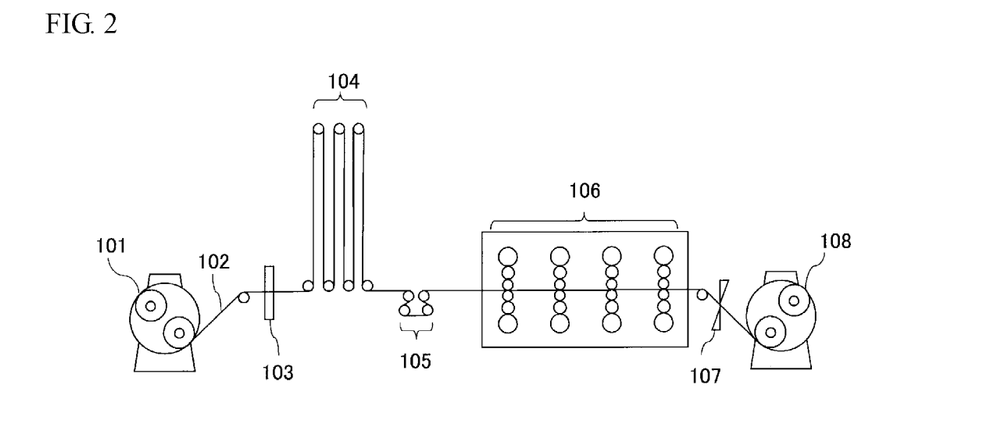
FIG. 2 is a schematic view illustrating an outline of a completely continuous type cold rolling facility.

FIG. 2 shows an outline of a completely continuous type four-stand cold rolling facility capable of adapting the method according to embodiments of the invention. A steel sheet 102 rewound from a coil state in a pay-off reel (rewinding machine) 101 is welded by a welding machine 103 so that a preceding sheet and a succeeding sheet thereof are joined together, passes through a looper 104, rolled in a cold rolling mill comprised of 4 stands to a predetermined sheet thickness and wound into a coil by a tension reel 108 disposed at an exit side thereof. The rolled steel sheet wound in the tension reel 108 is cut out at the welded portion of the preceding sheet and the succeeding sheet or when a given winding weight is reached by using a traveling shear 107 disposed at the exit side, and discharged. The succeeding steel sheet which is rolled after the cutting is wound by another waiting tension reel to continuously conduct the rolling.

Figure 3:
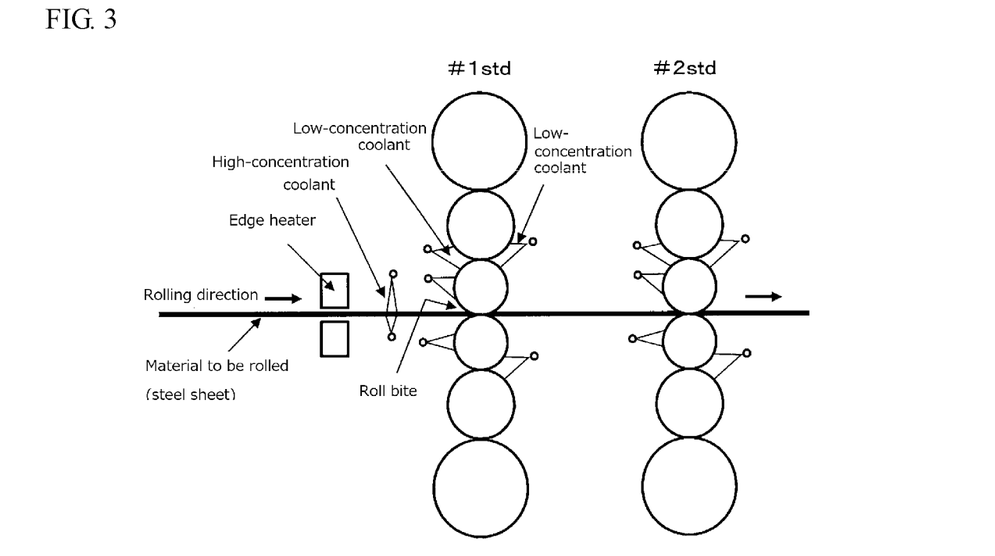
FIG. 3 is a schematic view illustrating the first half stage of the cold rolling mill shown in FIG. 2.

FIG. 3 shows an enlargement of the first half stage part of the 4 stand cold rolling mill shown in FIG. 2, that is, the first stand, the second stand and an entry side part of the first stand.

In the tandem type cold rolling mill of a circulating oil-feeding system, the feeding of a lubricant for rolling (rolling oil) and the cooling of rolls are usually conducted by jetting an emulsion (coolant) emulsified by mixing the rolling oil with water in a low concentration onto an outer periphery of each work roll and/or between the work roll and a middle roll by jetting devices arranged at an entry side and an exit side of each stand. In the invention, the coolant fed to the each stand is called as "low-concentration coolant" and the jetting device therefor is called as "low-concentration jetting device" hereinafter.

As the cold rolling oil are generally used a synthesis ester, a mineral oil, plant and animal oil and fat and so on. Also, a concentration of the rolling oil in the low-concentration coolant is usually about 1-5 mass %. Further, the temperature of the low-concentration coolant is usually controlled to about 40-70° C. in consideration of the cooling capacity.

In a conventional tandem type cold rolling mill of the circulating oil-feeding system, cold rolling is conducted with only the low-concentration coolant. If a hard-to-roll material such as silicon steel sheet, stainless steel sheet or the like is cold rolled only with the low-concentration coolant, edge crack is caused in an edge portion of the steel sheet resulting from poor ductility of the material to be rolled, and sheet breakage may be caused in the worst case.

In order to cope with the above problem, an edge heater for heating the both edge portions of the steel sheet is arranged at an upstream side of the first stand in the cold rolling mill according to an embodiment of the invention shown in FIG. 3, whereby it is made possible to heat the edge portions of the steel sheet to a temperature of not lower than a ductile-brittle transition temperature (60° C.). The heating system of the edge heater is not particularly limited as long as the edge portions of the steel sheet can be heated rapidly, but a technically established induction heating system is preferable.

It is preferable that the edge portion of the steel sheet is heated in the range of at least 30 mm from the widthwise end with the edge heater. However, if the heated region is excessively wide, the cost of the heating device is increased, and also electric energy required for the heating is increased, so that it is preferable to be about 50 mm at maximum.

Moreover, the edge heater is preferably arranged at a position in the range of 2-10 m from the first stand toward an upstream side. When it exceeds 10 m, heat loss becomes larger from the heating up to an arrival at a roll bite of the first stand, while when it is less than 2 m, a space for arranging a high-concentration coolant jetting device as described later may not be ensured.

It is important that the edge portion of the steel sheet is heated with the edge heater so that the temperature of the edge portion of the steel sheet at the entry side of the roll bite of the first stand is not lower than ductile-brittle transition temperature of the hardly-rolling material (60° C.). However, the low-concentration coolant is jetted at the entry side of the first stand, and liquid pool of the low-concentration coolant is formed in a roll bite part of the work roll, and hence the edge portion of the steel sheet heated with the edge heater is cooled. Therefore, in order that the edge portion of the steel sheet at the entry side of the roll bite in the first stand has a temperature of not lower than 60° C., the heating temperature with the edge heater (temperature of the edge heater at the exit side) is necessary to be set in view of the aforementioned heat loss by the low-concentration coolant. Moreover, the temperature of the edge portion of the steel sheet at the entry side of the roll bite in the first stand is preferably not lower than 80° C.

It should be further considered that as the temperature of the steel sheet is increased, the plate-out property of the rolling oil is deteriorated, and hence poor lubrication is caused in the edge portion of the steel sheet. When the jetting amount of the low-concentration coolant is increased at the entry side of the first stand or the low-concentration coolant is jetted onto the edge portion of the steel sheet to solve this problem, the edge portion of the steel sheet is further cooled, leading to a vicious circle that the heating temperature with the edge heater is necessary to be further increased to set the temperature of the edge portion of the steel sheet at the entry side of the roll bite to not lower than 60° C.

In order to solve the above problem, a high-concentration coolant jetting device capable of jetting a coolant having a rolling oil concentration higher than that of the low-concentration coolant (high-concentration coolant) is arranged between the edge heater and the rolling mill in the first stand in the cold rolling mill according to an embodiment of the invention shown in FIG. 3.

The high-concentration coolant is preferable to have a rolling oil concentration of not less than 10 mass %. The reason thereof will be described below.

Figure 4:
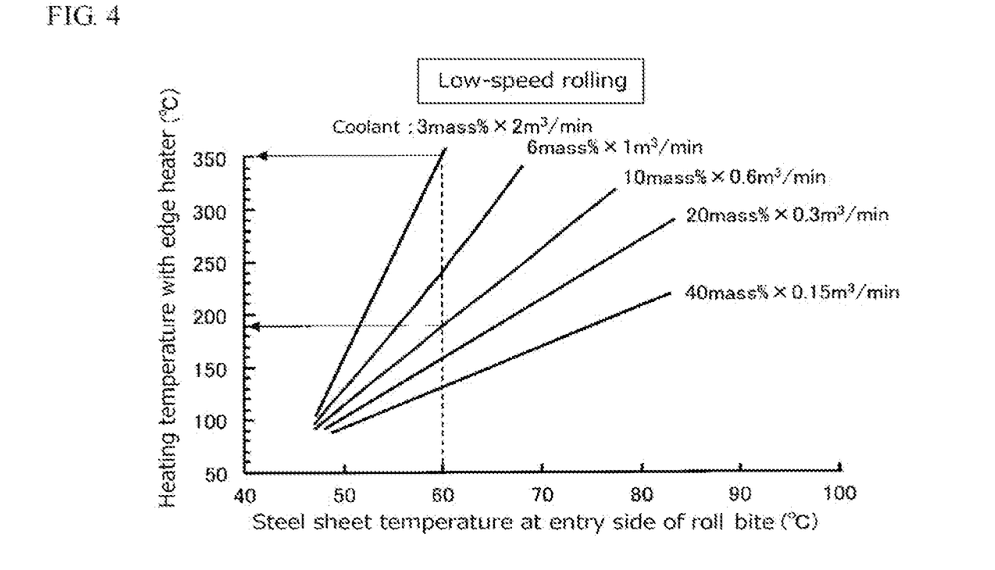
FIG. 4 is a graph showing an influence of a concentration of a rolling oil in a coolant upon a steel sheet temperature after the heating by an edge heater and a steel sheet temperature at an entry side of a roll bite.

FIG. 4 shows study results on a relation between a heating temperature with the edge heater and a steel sheet temperature at an entry side of a roll bite in the first stand when a hot rolled steel sheet having a sheet thickness of 2.0 mm is heated with the edge heater and then a coolant (temperature: 50° C.) having a constant feeding amount of the rolling oil and a various concentration and flow rate thereof is jetted from the aforementioned high-concentration coolant jetting device in a low-speed rolling (steel sheet speed at the entry side of the first stand: 20 mpm) of the cold rolling mill shown in FIG. 3. The edge heater is arranged in a position of 5 m from the first stand toward the upstream side thereof, and the high-concentration coolant jetting device is arranged in a position of 1 m from the first stand toward the upstream side thereof.

As seen from the results of FIG. 4, in order to decrease the heating temperature with the edge heater, a small amount of the high-concentration coolant has only to be jetted onto the edge surface of the steel sheet after the heating. For example, in order to set the steel sheet temperature at the entry side of the roll bite to 60° C., the heating temperature with the edge heater is necessary to be 350° C. when the concentration of the rolling oil in the coolant is 3 mass %, while it can be decreased to 190° C. when the concentration of the rolling oil in the coolant is 10 mass %. As the concentration of the rolling oil is further increased, the heating temperature with the edge heater can be further decreased.

In the cold rolling of the hard-to-roll material, it is desirable that the plate-out amount of the rolling oil (adhesion amount to the steel sheet surface) is usually not less than 50 mg/m$^2$ to ensure the rolling lubricity. However, as the steel sheet temperature increases as mentioned above, the plate-out amount of the rolling oil from the emulsified coolant decreases, and thus the rise of the heating temperature with the edge heater is not favorable to ensure the lubricity in the rolling.

Figure 5:
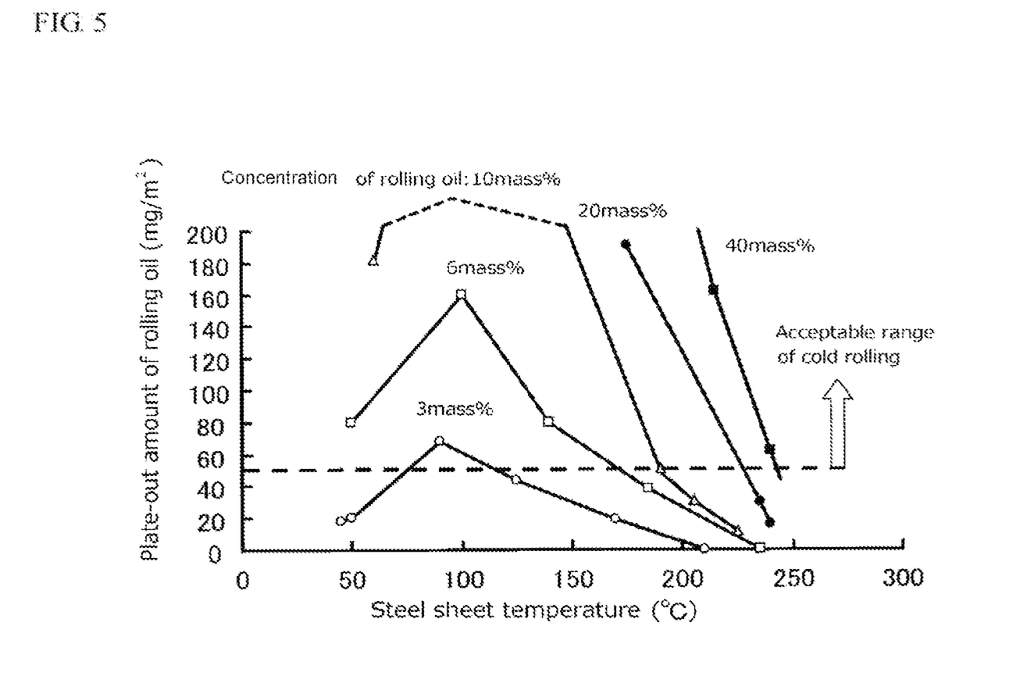
FIG. 5 is a graph showing an influence of a concentration of a rolling oil in a coolant upon a steel sheet temperature and a plate-out amount.

The influence of the steel sheet temperature upon the plate-out property of the coolant is examined by variously changing the concentration of the rolling oil, the result of which is shown in FIG. 5. As seen from this figure, when the steel sheet temperature is not lower than 100° C., the plate-out amount of the rolling oil of each coolant having a different rolling oil concentration decreases as the steel sheet temperature increases. In order to ensure the given plate-out amount when the steel sheet temperature is high, therefore, it is preferable to jet the high-concentration coolant. For example, in order to ensure the plate-out amount of the rolling oil of not less than 50 mg/m$^2$, the steel sheet temperature is necessary to be not higher than 120° C. when the concentration of the rolling oil in the coolant is 3 mass %, while, the steel sheet temperature may be not higher than 180° C. when the concentration of the rolling oil in the coolant is 10 mass %.

Figure 6:
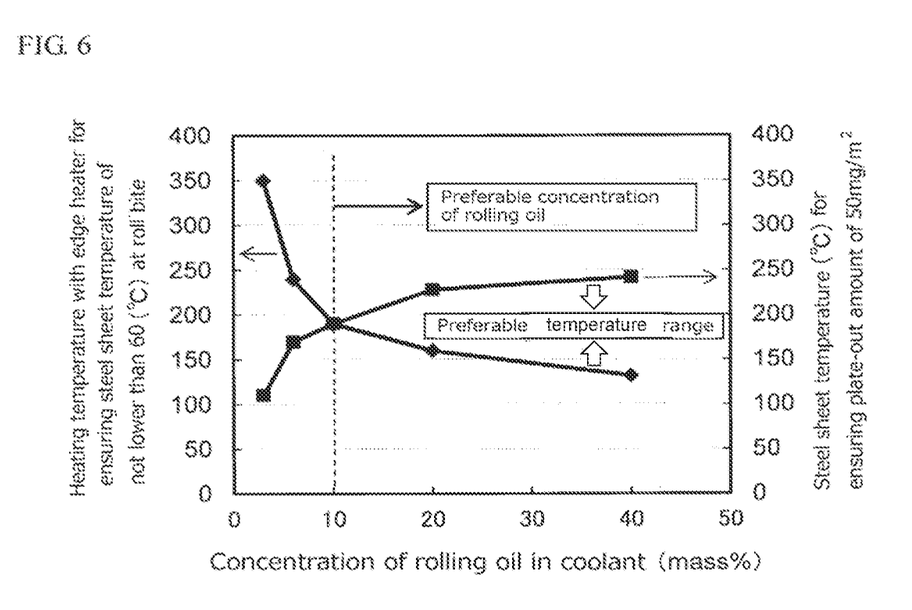
FIG. 6 is a graph showing a preferable range of a concentration of a rolling oil in a coolant.

FIG. 6 shows a relation between the concentration of the rolling oil in the coolant and the heating temperature with the edge heater necessary for obtaining the steel sheet temperature of not lower than 60° C. at the roll bite obtained from FIG. 4 and a relation between the concentration of the rolling oil in the coolant and the steel sheet temperature necessary for obtaining the plate-out amount of the rolling oil of not less than 50 mg/m$^2$ obtained from FIG. 5. As seen from this figure, the range establishing the concentration of the rolling oil in the coolant for ensuring the steel sheet temperature of not lower than 60° C. at the roll bite and the concentration of the rolling oil in the coolant for ensuring the plate-out amount of the rolling oil of not less than 50 mg/m$^2$ is approximately not less than 10 mass %, or a small amount of the coolant having a concentration of the rolling oil of not less than 10 mass % may only be jetted onto the surface of the edge portion of the steel sheet in order to decrease the heating temperature with the edge heater while maintaining the lubricity in the cold rolling. Moreover, the concentration of the rolling oil is more preferably not less than 20 mass %.

In the cold rolling mill as shown in FIG. 2 which conducts continuous rolling by welding the preceding coil with the succeeding coil at the entry side of the rolling mill, it is common to drop the rolling speed in the rolling of the welded portion of the preceding coil and the succeeding coil. However, when the jetting amount of the coolant, that is, the jetting amounts of the low-concentration coolant and the high-concentration coolant are constant in such a low-speed rolling, the cooling time by the coolant is prolonged. As a result, when the heating is conducted with the edge heater so that the temperature of edge portion of the steel sheet at the entry side of the roll bite in the high-speed rolling is not lower than 60° C., the edge portion of the steel sheet is substantially cooled in the low-speed rolling, and it is feared that the temperature at the entry side of the roll bite drops substantially below 60° C. Accordingly, it is preferable to adjust the jetting amount of the high-concentration coolant and/or the jetting amount of the low-concentration coolant at the entry side of the first stand in accordance with the rolling speed. Alternatively, it is preferable that the heating temperature with the edge heater is also adjusted in accordance with the rolling speed in addition to the jetting amount of the high-concentration coolant and/or the jetting amount of the low-concentration coolant at the entry side of the first stand.

In the above explanation, the jetting of the high-concentration coolant is limited only to the both edge portions of the steel sheet heated with the edge heater. However, if the width of the steel sheet to be rolled is changed or meandering of the steel sheet is caused under the above jetting limitation, it is necessary to use a control device for adjusting the jetting position of the high-concentration coolant, causing that the cost of the equipment and the load of maintenance are increased. Therefore, the region where the high-concentration coolant is jetted may be enlarged in consideration of the variation of the sheet width. Further, the high-concentration coolant may be jetted to the full width of the region, and the jetting amount of the low-concentration coolant may be reduced correspondingly.

Example

An experiment is conducted by subjecting a hot rolled steel sheet containing not less than 3.0 mass % of Si and having a sheet thickness of 2.0-3.0 mm to cold rolling to a sheet thickness of 0.3-0.5 mm with a completely continuous tandem-type cold rolling mill provided with an edge heater of an induction heating system for heating both edge portions of the steel sheet at a position of 5 m from the first stand toward an upstream side thereof and a high-concentration coolant jetting device for jetting a high-concentration coolant between the edge heater and the first stand.

The tandem type cold rolling mill is a circulating oil-feeding system and arranged with a low-concentration coolant jetting device for jetting a low-concentration coolant emulsified by mixing a rolling oil composed mainly of ester with water so as to have a concentration of 3 mass % (temperature: 50° C.) onto an outer periphery of work rolls in each stand and between the work roll and the middle roll.

The edge heater can heat a region within 30 mm from the widthwise end of each edge portion of the steel sheet by C-type inductors.

The high-concentration coolant jetting device is arranged at a position of 1 m from a roll bite in the first stand toward an upstream side thereof and arranged so that a high-concentration coolant emulsified by mixing a rolling oil composed mainly of ester with water so as to have a concentration of 10 mass % (temperature: 50° C.) can be jetted at a jetting amount of 0.1 m³/min over full width including the both edge portions of the steel sheet.

In this experiment, the setting conditions of the edge heater for heating the both edge portions of the steel sheet, the high-concentration coolant jetting device arranged between the heater and the first stand, and the low-concentration coolant jetting device in the first stand are varied to three conditions shown in Table 1.

Concretely, the rolling condition 1 is an example (conventional example) that the jetting amount of the low-concentration coolant at the entry side of the first stand is set to be 5 m³/min and moreover the both edge portions (width: 30 mm) of the steel sheet are heated with the edge heater but the jetting of the high-concentration coolant is not conducted, wherein electric energy of the edge heater is set so that the temperature of the edge portion of the steel sheet is 60° C. at the entry side of the roll bite in the first stand.

The rolling condition 2 is an example (comparative example) that electric energy of the edge heater is reduced to 70 with respect to the rolling condition 1, wherein the consumed power of the rolling condition 1 is set to 100 (base).

The rolling condition 3 is an example (invention example) that the jetting amount of the low-concentration coolant is reduced to 75 with respect to the rolling condition 2, wherein the jetting amount in the rolling condition 1 or 2 is set to 100 (base) and the high-concentration coolant is jetted.

Moreover, the experimental results are evaluated by a breakage generating rate (%) as a ratio of the number of coils generating sheet breakage to the total coil number in each rolling condition and are also shown in Table 1.

In the rolling condition 2 that the electric energy of the edge heater is reduced as compared to the rolling condition 1, the consumed power decreases, but the temperature in the edge portion of the steel sheet at the entry side of the roll bite drops to 40° C. due to poor heating in the edge portion of the steel sheet, so that sheet breakage is frequently caused by edge cracking and the sheet breakage generating rate is increased up to 1.4%.

In the rolling condition 3 that the jetting amount of the low-concentration coolant is reduced as compared to the rolling condition 2 and the high-concentration coolant is jetted, the electric energy of the edge heater is reduced similarly in the rolling condition 2, but the reduction of the heat loss in the edge portion of the steel sheet by the reduction of the jetting amount of the low-concentration coolant is larger than that of the heat loss by the jetting of the high-concentration coolant, so that the temperature in the edge portion of the steel sheet increases to 60° C. at the entry side of the roll bite. Further, the sheet breakage generating rate of due to edge cracking is largely improved as compared to the rolling condition 2, in association with the improvement of the plate-out property of the rolling oil by the jetting of the high-concentration coolant, and reduced to 0.2%, which is lower than that in the conventional technique.

As seen from these results, the generation of sheet breakage can be largely reduced by jetting the high-concentration coolant through the application of the invention even if the electric energy for heating by the induction heating device or the jetting amount of the low-concentration coolant is decreased.

DESCRIPTION OF REFERENCE SYMBOLS

1: steel sheet
2: C-type introducer (inductor)
3: induction heating coil
101: pay-off reel
102: steel sheet
103: welding machine
104: looper
105: meandering control device (bridle roll)

TABLE 1

| | Conditions at entry side of rolling facility | | | | |
|---|---|---|---|---|---|
| Rolling condition | Electric energy ratio of induction heating device *1 | Ratio of jetting amount of low-concentration coolant *2 | Use of high concentration coolant | Sheet breakage generating rate (%) | Remarks |
| 1 | 100 | 100 | no use | 0.4 | Conventional Example |
| 2 | 70 | 100 | no use | 1.4 | Comparative Example |
| 3 | 70 | 75 | use | 0.2 | Invention Example |

*1 Electric energy of rolling condition 1 is set to 100 (base).
*2 Jetting amount of low-concentration coolant in rolling condition 1 is set to 100 (base).

As shown in Table 1, the sheet breakage generating rate is 0.4% in the rolling condition 1 that the edge portion of the steel sheet is heated with the edge heater so that the temperature at the entry side of the roll bite in the first stand is 60° C. but the high-concentration coolant is not jetted. Further, the heating temperature with the edge heater is necessary to be increased for compensation of cooling by the low-concentration coolant, so that electric energy for heating is also significant.

106: rolling machine of 4 stands
107: traveling shear
108: tension reel

The invention claimed is:
1. A cold rolling mill of a tandem type of a circulating oil-feeding system, the cold rolling mill comprising:
a plurality of stands including a first stand;
a first jetting device for feeding a low-concentration coolant comprising a rolling oil and a cooling water to each stand of the plurality of stands to continuously conduct rolling of a steel sheet, an edge heater for heating both edge portions of the steel sheet, the edge portions encompassing a region of 50 mm or less from both widthwise edges of the steel sheet, to not lower than 60° C. as a temperature of the steel sheet at an entry side of a roll bite arranged at an upstream side of the first stand of the cold rolling mill; and a second jetting device configured to jet a coolant onto surfaces of both of the edge portions of the steel sheet, the coolant comprising the rolling oil and the cooling water and having a concentration of the rolling oil higher than that of the low-concentration coolant fed to the first stand, the second jetting device arranged between the edge heater and the first stand and at an upstream side from the first jetting device, wherein the coolant having the concentration higher than that of the low-concentration coolant is jetted to only both of the edge portions of the steel sheet.

2. The cold rolling mill according to claim 1, wherein the edge heater is an induction heating device for heating only the edge portions of the steel sheet by inserting the edge portion of the steel sheet into a slit portion of a C-type inductor to hold from top and bottom thereof.

3. The cold rolling mill according to claim 2, wherein the coolant having the concentration higher than that of the low-concentration coolant fed to the first stand has a concentration of a rolling oil of not less than 10 mass %.

4. The cold rolling mill according to claim 1, wherein the coolant having the concentration higher than that of the low-concentration coolant fed to the first stand has a concentration of a rolling oil of not less than 10 mass %.

5. A method for cold rolling a steel sheet with a tandem type cold rolling mill of a circulating oil-feeding system, the system including a plurality of stands including a first stand and a jetting device for feeding a low-concentration coolant ascomprising a rolling oil and a cooling water to each stand of the plurality of stands, the method comprising:

heating both edge portions of the steel sheet with an edge heater at an upstream side of the first stand of the cold rolling mill, the edge portions encompassing a region of 50 mm or less from both widthwise edges of the steel sheet, to not lower than 60° C. as a steel sheet temperature at an entry side of a roll bite in the first stand, and jetting a coolant onto surfaces of both of the edge portions of the steel sheet, the coolant comprising the rolling oil and the cooling water and having a concentration of the rolling oil higher than that of the low-concentration coolant fed to the first stand, the coolant being jetted before the both heated edge portions of the steel sheet arrive at the roll bite of the first stand at a position between the edge heater and the first stand and at an upstream side from the jetting device, wherein the coolant having the concentration higher than that of the low-concentration coolant is jetted to only both of the edge portions of the steel sheet.

6. The cold rolling method according to claim 5, wherein the coolant having the concentration higher than that of the low-concentration coolant fed to the first stand has a concentration of a rolling oil of not less than 10 mass %.

7. The cold rolling method according to claim 6, wherein a jetting amount of the high-concentration coolant and/or a jetting amount of the low-concentration coolant at the entry side of the first stand are adjusted in accordance with a rolling speed.

8. The cold rolling method according to claim 5, wherein a jetting amount of the high-concentration coolant and/or a jetting amount of the low-concentration coolant at the entry side of the first stand are adjusted in accordance with a rolling speed.

* * * * *

UNITED STATES PATENT AND TRADEMARK OFFICE
CERTIFICATE OF CORRECTION

PATENT NO. : 11,612,923 B2
APPLICATION NO. : 16/488339
DATED : March 28, 2023
INVENTOR(S) : Tatsuhito Fukushima It is certified that error appears in the above-identified patent and that said Letters Patent is hereby corrected as shown below:

In the Claims

Column 12, Line 1, "ascomprising" should be "comprising".

Signed and Sealed this
Thirteenth Day of June, 2023

Katherine Kelly Vidal
*Director of the United States Patent and Trademark Office*